United States Patent
Seo

(10) Patent No.: US 9,123,488 B2
(45) Date of Patent: Sep. 1, 2015

(54) SAFETY SHUTTER OF VACUUM CIRCUIT BREAKER

(71) Applicant: LSIS CO., LTD., Anyang-si, Gyeonggi-do (KR)

(72) Inventor: Min Kyu Seo, Cheongju-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 14/472,066

(22) Filed: Aug. 28, 2014

(65) Prior Publication Data
US 2015/0179374 A1   Jun. 25, 2015

(30) Foreign Application Priority Data
Dec. 20, 2013   (KR) .................. 10-2013-0160480

(51) Int. Cl.
*H01H 33/48*   (2006.01)
*H01H 33/666*   (2006.01)
*H01H 33/662*   (2006.01)

(52) U.S. Cl.
CPC ............. *H01H 33/48* (2013.01); *H01H 33/666* (2013.01); *H01H 33/66261* (2013.01)

(58) Field of Classification Search
CPC ........... H01H 9/08; H01H 9/22; H01H 33/53; H02B 11/24; H02B 1/14
USPC ............ 218/139, 140; 200/304, 50.17, 50.21, 200/50.22, 334
See application file for complete search history.

(56) References Cited

U.S. PATENT DOCUMENTS

2012/0217223 A1* 8/2012 Kim ............................. 218/140
2012/0261239 A1* 10/2012 Kim et al. .................... 200/304

FOREIGN PATENT DOCUMENTS

| GB | 2126011 | 3/1984 |
| JP | 54-68946 | 6/1979 |
| JP | 2010-136534 | 6/2010 |
| JP | 2012-178969 | 9/2012 |
| KR | 20-2000-0003186 | 2/2000 |
| KR | 10-2003-0080745 | 10/2003 |
| KR | 10-1106854 | 1/2012 |

OTHER PUBLICATIONS

Korean Intellectual Property Office Application Serial No. 10-2013-0160480, Notice of Allowance dated Feb. 5, 2015, 2 pages.
European Patent Office Application Serial No. 14182985.3, Search Report dated May 8, 2015, 7 pages.

* cited by examiner

*Primary Examiner* — Renee S Luebke
*Assistant Examiner* — William Bolton
(74) *Attorney, Agent, or Firm* — Lee, Hong, Degerman, Kang & Waimey

(57) ABSTRACT

The present invention relates to a safety shutter of a vacuum circuit breaker, and more particularly, to a safety shutter of a vacuum circuit breaker which is mounted on a cradle of a drawable type vacuum circuit breaker and opened or closed when a main body is retracted or pulled out to protect the safety of users from a charging part.

6 Claims, 12 Drawing Sheets

SAFETY SHUTTER OF VACUUM CIRCUIT BREAKER

CROSS-REFERENCE TO RELATED APPLICATION

Pursuant to 35 U.S.C. §119(a), this application claims the benefit of earlier filing date and right of priority to Korean Application No. 10-2013-0160480, filed on Dec. 20, 2013, the contents of which are all hereby incorporated by reference herein in its entirety.

BACKGROUND OF THE INVENTION

1. Field of the Invention

The present invention relates to a safety shutter of a vacuum circuit breaker, and more particularly, to a safety shutter of a vacuum circuit breaker which is mounted on a cradle of a drawable type vacuum circuit breaker and opened or closed when a main body is retracted or pulled out to protect the safety of users from a charging part.

2. Description of the Conventional Art

In general, a vacuum circuit breaker is a circuit breaker installed in a high voltage electric power system to break a circuit to protect the electric power system in the event of a dangerous situation such as a short circuit, an overcurrent, and the like, and it is designed by utilizing excellent insulating performance and arc-extinguishing capability in a vacuum state.

The vacuum circuit breaker is categorized into a drawable type vacuum circuit breaker and a fixed type vacuum circuit breaker. That is, the vacuum circuit breaker is divided into a fixed type circuit breaker which consists only of a main body and is fixed to a switch panel, and a drawable type circuit breaker which is configured to have an outer box called a cradle for facilitating the maintenance and repair of the circuit breaker so that a main body is retracted into or pulled out of the cradle.

FIG. 1 illustrates a cradle 1 of a drawable type vacuum circuit breaker according to the conventional art. The vacuum circuit breaker includes a variety of auxiliary equipment and safety devices. An example of them is a safety shutter 3 located in front of a charging part 2.

The safety shutter 3 of the vacuum circuit breaker is a device that ensures user safety from the charging part 2 by opening or closing the charging part 2 when a main body (not shown) is retracted or pulled out. FIG. 2 illustrates the safety shutter (shutter m assembly) of FIG. 1. The safety shutter according to the conventional art includes an operating lever 4 that receives the pushing force generated by the forward motion of the main body when the main body is retracted, a shutter guide 5 that moves down by the rotation of the operating lever 4, a shutter handle 6 that is turned clockwise or counterclockwise by the movement of the shutter guide 5, a shutter panel 7 that serves to shield the charging part 2, and shutter link 8 that serves as the axis of rotation while supporting the rotation of the shutter panel 7.

The operation of the safety shutter of the vacuum circuit breaker according to the conventional art will be described as follows.

When the main body is retracted into the cradle 1, a protrusion 4a to be brought into contact with the main body is pushed by contact pressure and rotates the operating lever 4 counterclockwise around the coupling axis 4b. The shutter guide 5 connected to the front end of the operating lever 4 moves down, and the shutter guide 5 causes the shutter handle 6 rotatably fixed to a cradle side plate 9 by a shutter handle shaft 6a to rotate. As the shutter handle 6 rotates, the shutter panel 7 rotates to open the charging part 2.

Hereupon, the shutter panel 7 rotates, supported on the shutter link 8. That is, the shutter link 8 acts as the axis of rotation, with one end 8a attached to the cradle side plates 9, and the shutter panel 7 is attached to the other end 8b. Accordingly, the shutter link 8 has a rotation radius setting when the shutter panel 7 attached to the shutter panel 6 rotates. The radius of rotation is the distance between one end 8a and the other end 8b of the link. That is, the rotation of the shutter panel 7 depends on the shutter link 8. However, since the shutter link 8 is fixed, the shutter panel 7 will not move properly and interfere with the charging part 2 or main circuit terminals of the main body in case of any defects or loosening.

SUMMARY OF THE INVENTION

Therefore, the present invention has been made in an effort to solve the above-mentioned problems and provide a safety shutter of a vacuum circuit breaker which operates stably without interference with peripheral parts and facilitates the adjustment of the radius of rotation, rotation speed, and rotation angle of a shutter panel.

To achieve these and other advantages and in accordance with the purpose of this specification, as embodied and broadly described herein, there is provided a safety shutter of a vacuum circuit breaker including: a pair of operating levers that rotates by the contact pressure received from a main body, with one end rotatably attached to lower side plates of a cradle; a pair of shutter guides that is made of a plate material and moves vertically, with the lower end connected to the operating levers; a pair of first shutter handles and a pair of second shutter handles that are rotatably mounted on the cradle and rotate with the movement of the shutter guides; a first shutter panel and a second shutter panel that are fixed to one end of the first and second shutter handles to open or close a charging part of the circuit breaker and have panel holders on either side; and a pair of return springs that raises the shutter guides when the main body is pulled out, with the upper end fixed to part of side plates of the cradle and the lower end attached to part of the operating levers, wherein cam holes are formed on the side plates of the cradle so that the panel holders move along the cam holes when the first shutter panel and the second shutter panel are opened or closed.

The safety shutter further includes plate-like cam brackets that are attached to the side plates, the cam brackets including bracket cam holes having the same shape as the cam holes.

The cam brackets are detachably attached to the side plates.

Fastening holes are formed in the side plates, and the cam brackets are attached to the fastening holes.

Rollers are attached to the shafts of the panel holders to cause the panel holders to roll along the cam holes when the shutter panels are opened or closed.

The radius of rotation, rotation speed, and rotation angle of the first and second shutter panels are adjusted by varying the shape of the cam holes.

The first and second shutter panels, the first and second shutter handles, and the cam brackets are symmetrically arranged at upper and lower portions of the cradle so that, when the main body is retracted, the first shutter panel in the upper portion moves upward and the second shutter panel in the lower portion moves downward.

A safety shutter of a vacuum circuit breaker according to an embodiment of the present invention is advantageous in that the safety shutter operates stably without interference with peripheral parts.

Furthermore, the safety shutter can easily cope with changes in the capacity of the vacuum circuit breaker, the size of the main body, and so on by facilitating the adjustment of the radius of rotation, rotation speed, and rotation angle of the shutter panels.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Hereinafter, a preferred embodiment of the present invention will be described in detail with reference to the accompanying drawings. It should be understood that the embodiment will be described for illustrative purposes only so that those skilled in the art can easily work the present invention and does not limit the technical spirit and scope of the invention.

Figure 1:
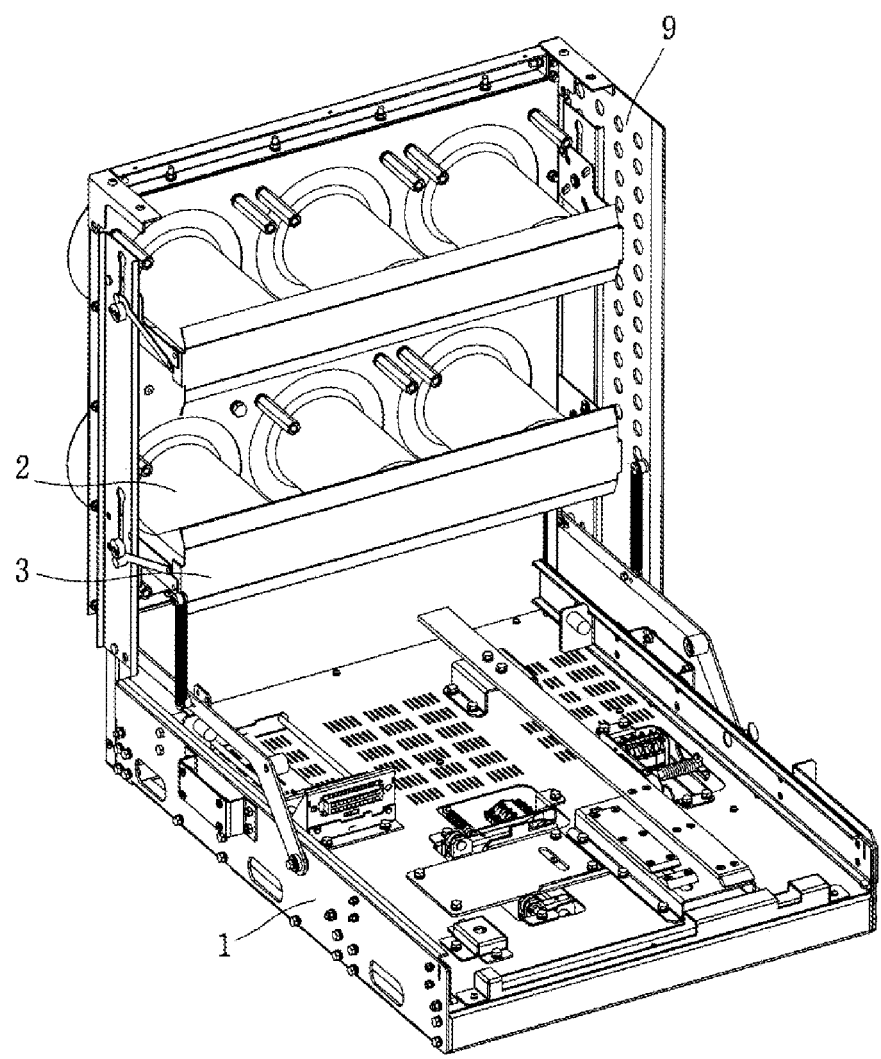
FIG. 1 illustrates a cradle 1 of a drawable type vacuum circuit breaker according to the conventional art.
Figure 2:
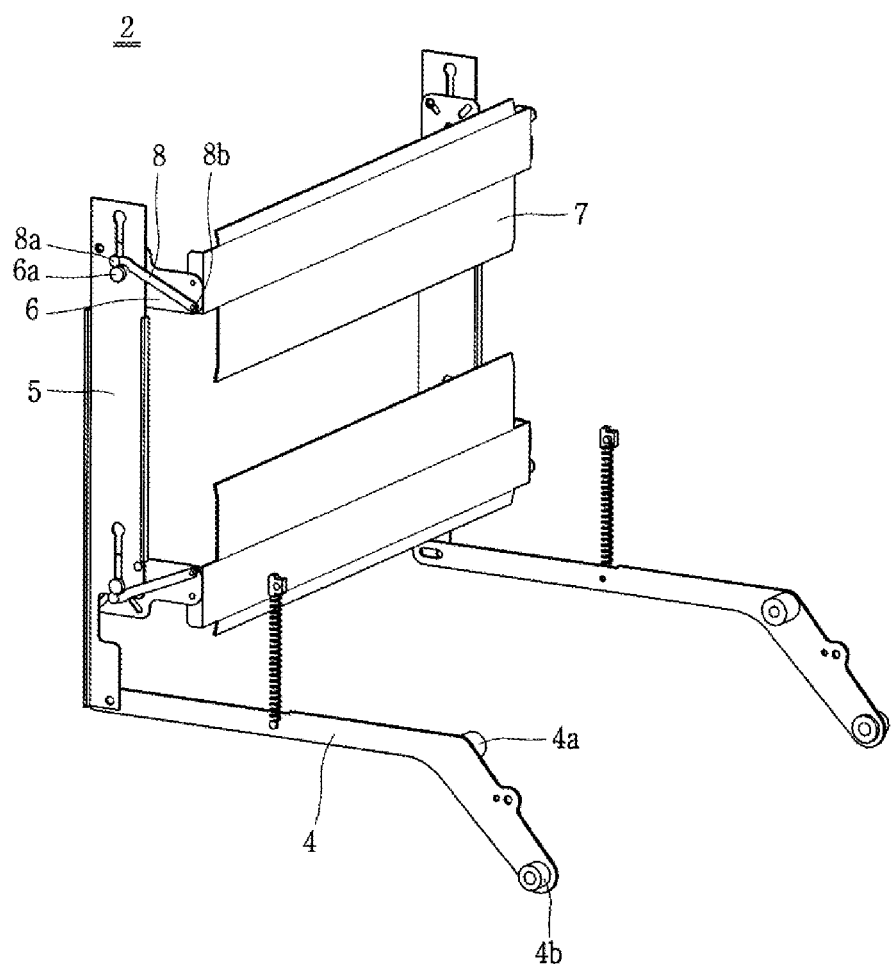
FIG. 2 is a perspective view of a shutter assembly of FIG. 1.
Figure 3:
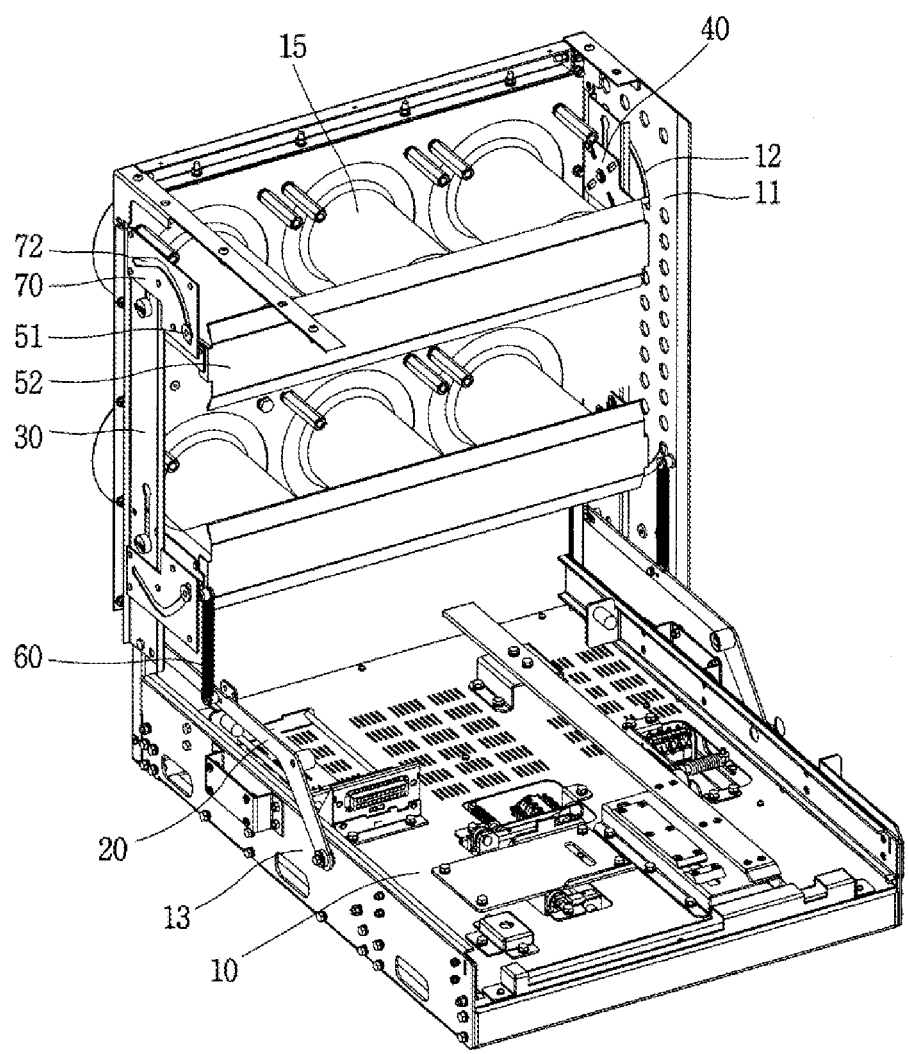
FIG. 3 is a perspective view of a cradle of a vacuum circuit breaker according to an embodiment of the present invention.
Figure 4:
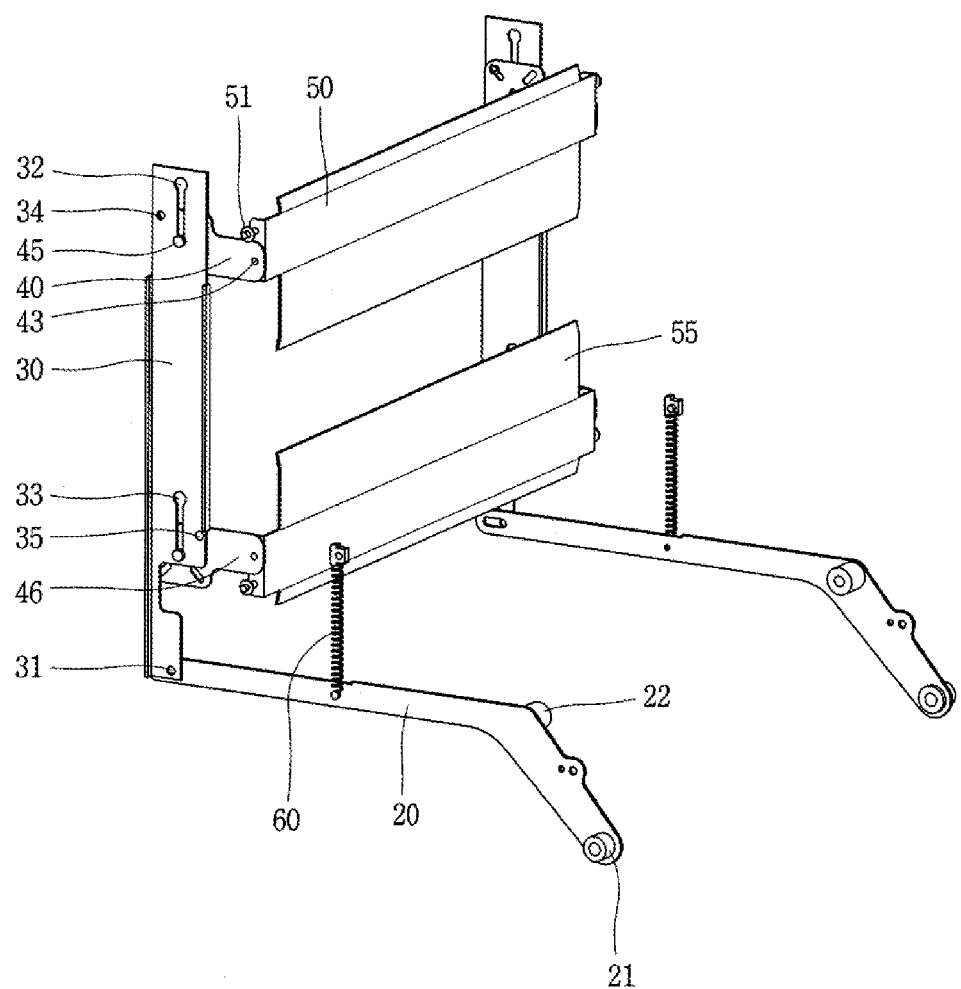
FIG. 4 is a perspective view of a shutter assembly of FIG. 3.
Figure 5A:
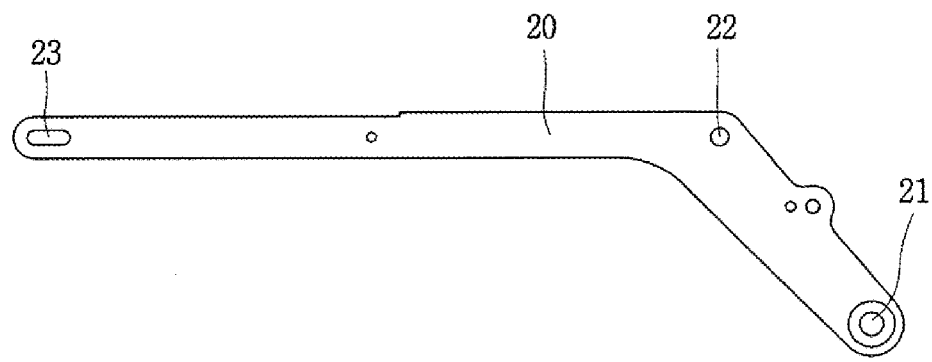
FIGS. 5a and 5b illustrate a top plan view and front view of an operating lever.
Figure 5B:
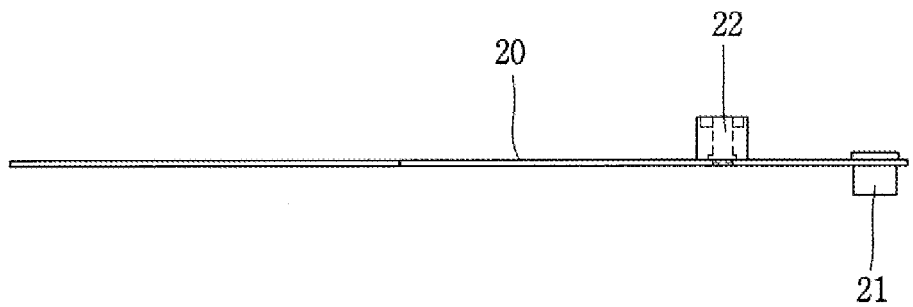
Figure 6A:
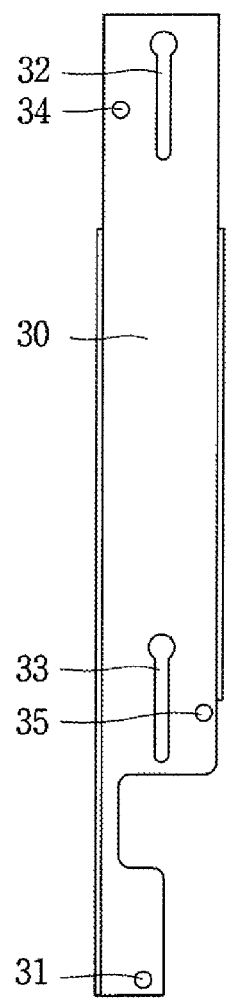
FIGS. 6a and 6b illustrate a front view and right side view of a shutter guide.
Figure 6B:
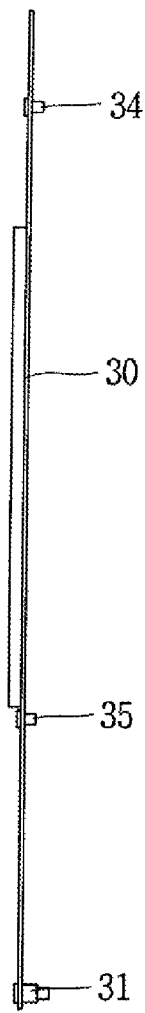
Figure 7A:
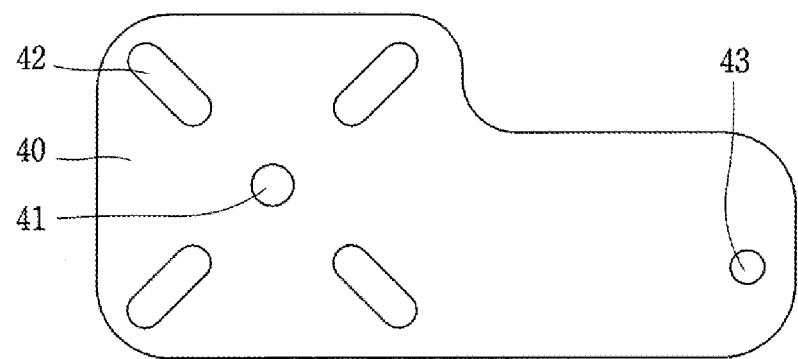
FIGS. 7a and 7b illustrate a front view and right side view of a shutter handle.
Figure 7B:
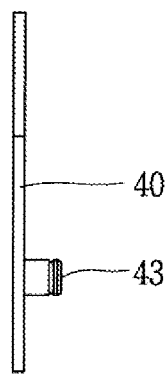
Figure 8A:
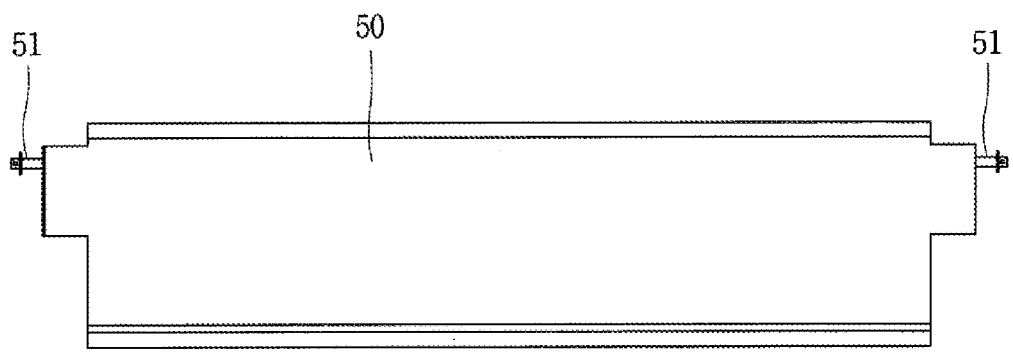
FIGS. 8a and 8b illustrate a front view and left side view of a shutter panel.
Figure 8B:
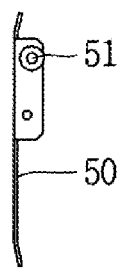

FIG. 3 is a perspective view of a cradle of a vacuum circuit breaker according to an embodiment of the present invention. FIG. 4 is a perspective view of a shutter assembly of FIG. 3. FIGS. 5a and 5b illustrate a top plan view and front view of an operating lever. FIGS. 6 a and 6b illustrate a front view and right side view of a shutter guide. FIGS. 7 a and 7b illustrate a front view and right side view of a shutter handle. FIGS. 8 a and 8b illustrate a front view and left side view of a shutter panel. The safety shutter of the vacuum circuit breaker according to the embodiment of the present invention will be described in detail with reference to the drawings.

A safety shutter of a vacuum circuit breaker according to one embodiment of the present invention includes: a pair of operating levers 20 that rotates by the contact pressure received from a main body, with one end rotatably attached to lower side plates 13 of a cradle 10; a pair of shutter guides 30 that is made of a plate material and moves vertically, with the lower end connected to the operating levers 20; a pair of first shutter handles 40 and a pair of second shutter handles 46 that are rotatably mounted on the cradle 10 and rotate with the movement of the shutter guides 30; a first shutter panel 50 and a second shutter panel 55 that are fixed to one end of the first and second shutter handles 40 and 46 to open or close a charging part 15 of the circuit breaker and have panel holders 51 on either side; and a pair of return springs 60 that raises the shutter guides 30 when the main body is pulled out, with the upper end fixed to part of side plates 11 of the cradle 10 and the lower end attached to part of the operating levers 20. Cam holes 12 are formed on the side plates 11 of the cradle 10 so that the panel holders 51 move along the cam holes 12 when the first shutter panel 50 and the second shutter panel 55 are opened or closed.

The safety shutter, i.e., shutter assembly, of the vacuum circuit breaker according to the embodiment of the present invention roughly includes an operating lever 20, a shutter guide 30, shutter handles 40 and 46, shutter panels 50 and 55, and a return spring 60.

The operating lever 20 is made up of an L-shaped bar or long panel that forms an obtuse angle. A fastener 21 is provided at one end of the operating lever 20 so as to be rotatably attached to a lower side plate 13 of the cradle 10. The fastener 21 has a through-hole to attach the operating lever 20 to the lower side plate 13 by a bolt or rivet. The operating lever 20 is rotatable around the fastener 21.

A stopping piece 22 protrudes inward at a bent portion of the operating lever 20. When the main body (not shown) is retracted, the main body comes into contact with the stopping piece 22 to transfer a forward pushing force and therefore produce torque on the operating lever 20 to cause the operating lever 20 to rotate around the fastener 21.

A sliding hole 23 is longitudinally formed at the other end of the operating lever 20. The operating lever 20 is connected to the shutter guide 30 to be described later through the sliding hole 23.

The operating lever 20 is provided in a symmetrical pair on the left and right sides of the cradle 10.

The shutter guide 30 is made up of a vertical longitudinal plate. A protrusion 31 is formed on the lower end of the shutter guide 30 and slidably attached to the sliding hole 23 of the operating lever 20.

A first long hole 32 and a second long hole 33 are formed lengthwise on upper and lower parts of the shutter guide 30. The shutter handles 40 and 46 to be described later are attached to a lower plate 11 of the cradle 10 through the first and second long holes 32 and 33. As the shutter guide 30 is constrained by a fastening means 45 for attaching the shutter handle 40 to the side plate 11 of the cradle 10, it moves only vertically. That is, when the operating lever 20 rotates, the protrusion 31 attached to the sliding hole 23 receives force. Because the horizontal component of the force causes sliding, only the vertical component of the force is transferred to the protrusion 31 to move the shutter guide 30 only vertically.

A first stopping piece 34 and a second stopping piece 35 are formed inward on the upper and lower parts of the shutter guide 30, respectively. As viewed in FIG. 4, the first stopping piece 34 is formed on the left side of the first long hole 32, and the second stopping piece 35 is formed on the right side of the second stopping piece 35.

The shutter guide 30 is provided in a symmetrical pair on the left and lower sides of the cradle 10.

The shutter handles 40 and 46 are formed of a rectangular plate material. The shutter handles 40 and 46 consist of a first shutter handle 40 provided at the upper portion of the cradle 10 and a second shutter handle 46 provided at the lower portion of the cradle 10. A center hole 41 and a plurality of slant holes 42 radially extending from the center hole 41 are formed on one side of the shutter handles 40 and 46. The shutter handles 40 and 46 are rotatably attached to the side plate 11 of the cradle 10 through the fastening means 45 passing through the center hole 41. The fastening means 45 may be a bolt or rivet. The shutter assembly is supported by being attached to the side plate 11 of the cradle 10 by the fastening means.

The first stopping piece 34 or second stopping piece 35 is inserted into the slant holes 42 of the shutter handles 40 and 46, and the shutter handles 40 and 46 receive torque by the vertical movement of the shutter guide 30 and rotate clockwise or counterclockwise. That is, as viewed in FIG. 4, the downward movement of the shutter guide 30 causes the first shutter handle 40 to rotate counterclockwise because the first stopping piece 34 is attached to a slant hole 42 on the left side of the center hole 41, and the downward movement of the shutter guide 30 causes the second shutter handle 46 to rotate clockwise because the second stopping piece 35 is attached to a slant hole 42 on the right side of the center hole 41.

A coupling protrusion 43 is formed on the other side of the shutter handle 40 and rotatably attached to the shutter panel 50 to be described later.

The shutter handles 40 and 46 are provided in symmetrical pairs on the left and right sides of the cradle 10.

The shutter panels 50 and 55 are approximately rectangular. Panel holders 51 are provided on either side of the shutter panels 50 and 55. The panel holders 51 are fit to the cam holes 12 of the side plates 11 of the cradle 10. Although not shown, rollers may be inserted into the shafts of the panel holders 51. Accordingly, as the panel holders 51 slide along the cam holes 12, they may roll and move smoothly. Besides, bearings or other parts may be used to help reduce friction.

The shutter panels 50 and 55 consist of a first shutter panel 50 provided at the upper portion of the cradle 10 and a second shutter panel 55 provided at the lower portion of the cradle 10.

The upper end of the return spring 60 is fixed to part of the side plate 11 of the cradle 10, and the lower end thereof is fixed to the center of the operating lever 20. Normally, the return spring 60 supplies force to maintain the operating lever 20 in a horizontal position. On the other hand, when the main body is pulled out after the shutter guide 30 has moved down by the rotation of the operating lever 20, the return spring 60 supplies force to pull up the operating lever 20 again.

Figure 9:
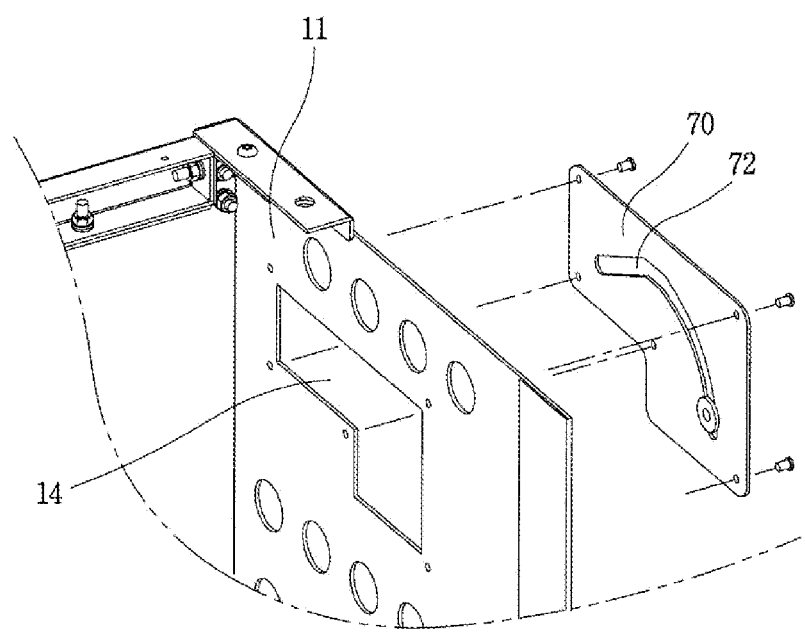
FIG. 9 is a partial detailed view of a cradle of a vacuum circuit breaker according to another embodiment of the present invention.

Cam brackets 70 are fastened to positions on the side plates 11 of the cradle 10 where the cam holes 12 are formed. Bracket cam holes 72 are formed in the same shape as the cam holes 12 formed on the side plates 11 of the cradle 10. According to embodiments, the cam brackets 70 may be detachably fastened to the side plates 11. That is, referring to FIG. 9, a fastening hole 14 of a size enough to include the bracket cam hole 72 is formed in the side plate 11, and the cam bracket 70 is detachably attached to the side plate 11.

Figure 10A:
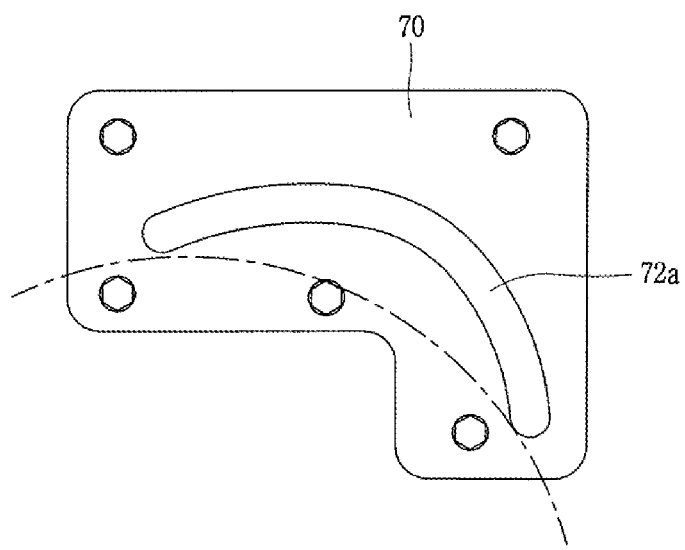
FIGS. 10 a and 10b shows another examples of a cam bracket.
Figure 10B:
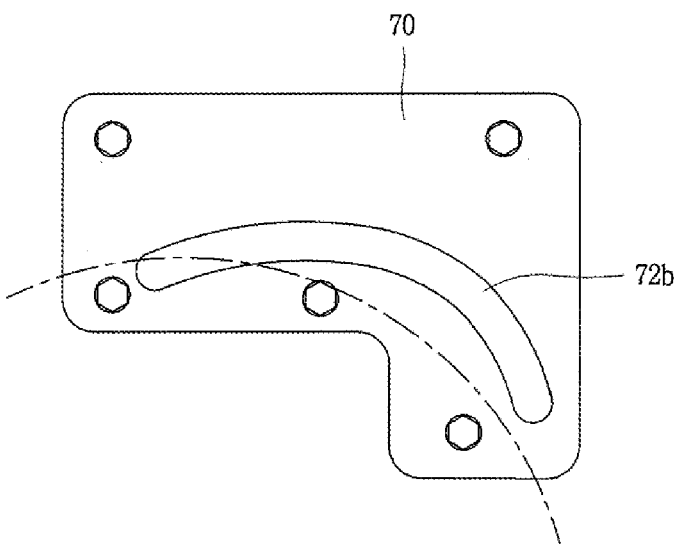

As the cam bracket 70 with the bracket cam hole 72 that comes in a variety of shapes as necessary is fastened to the side plate 11, the adjustment of the radius of rotation, rotation angle, etc of the shutter panel 50 is facilitated. That is, referring to FIGS. 10a and 10b, the line of movement of the coupling protrusion 43 of the shutter handle 40 is indicated in virtual line. The bracket cam hole 72b of FIG. 10b shows an abrupt change in angle compared to the bracket cam hole 72a of FIG. 10a, and the rotation speed of the shutter panel 50 therefore changes abruptly. Also, the radius of rotation or the angle of opening or closing the shutter panel 50 can be adjusted by adjusting the start and end positions of the bracket cam hole 72.

Figure 11:
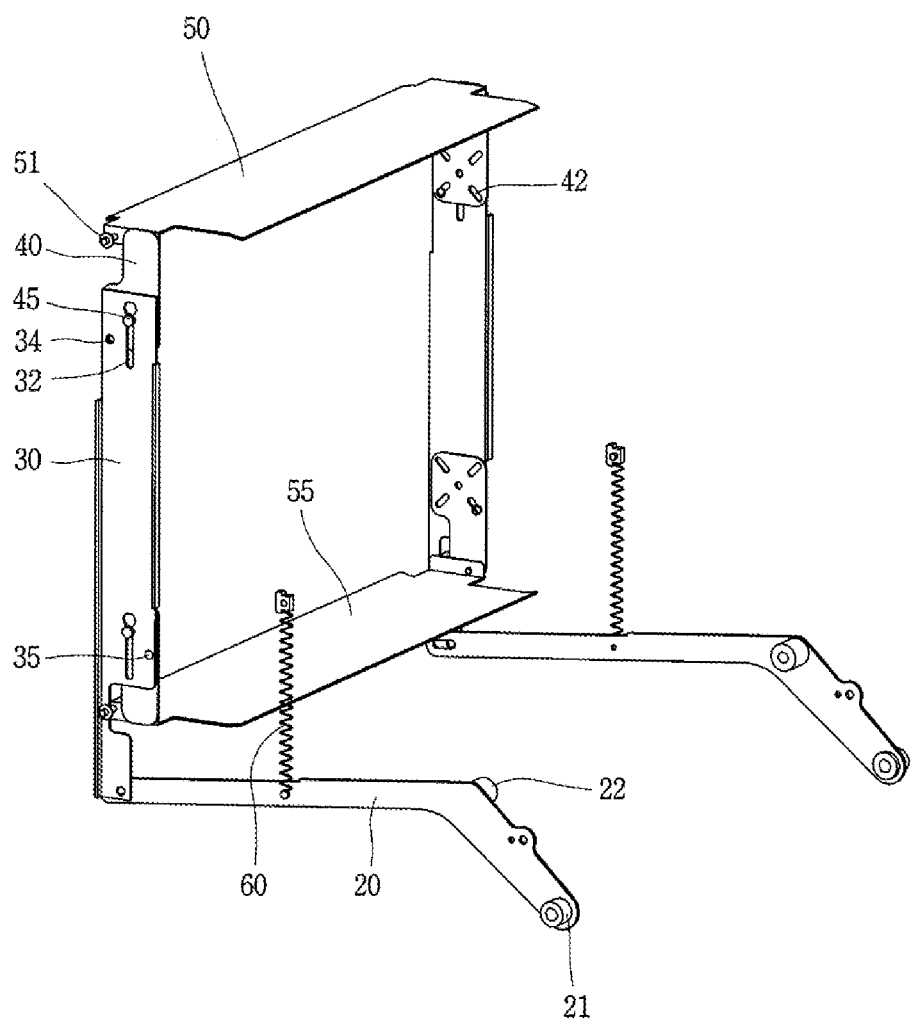
FIG. 11 is a view of the operating state of the shutter assembly, which illustrates the shutter assembly when the main body of the circuit breaker is retracted.

The operation of the safety shutter of the vacuum circuit breaker according to the embodiment of the present invention will be described. FIG. 4 illustrates the shutter assembly when the main body of the circuit breaker is pulled out. FIG. 11 illustrates the shutter assembly when the main body of the circuit breaker is retracted.

When the main body is retracted into the cradle 10, the operating lever 20 rotates around the fastener 21 by the contact pressure applied on the stopping piece 22. As the operating lever 20 rotates, the shutter guide 30 connected to the sliding hole 23 moves down. As the shutter guide 30 moves down, the contact pressure received from the first stopping piece 34 or second stopping piece 35 causes the first shutter handle 40 to rotate counterclockwise and the second shutter handle 46 to rotate clockwise. Accordingly, the first shutter panel 50 opens upward and the second shutter panel 55 opens downward. The rotation speed or rotation angle of the shutter panels 50 and 55 is adjusted depending on the shape of the cam holes 72 of the cam brackets 70.

When the main body is pulled out of the cradle 10, the operating lever 20 rotates clockwise by the restorative force of the return spring 60 applies force in a direction opposite to when the shutter panels 50 and 55 are opened, thereby closing the shutter panels 50 and 55.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

What is claimed is:

1. A safety shutter of a vacuum circuit breaker, comprising:
a pair of operating levers that rotates by the contact pressure received from a main body, with one end rotatably attached to lower side plates of a cradle;
a pair of shutter guides that is made of a plate material and moves vertically, with the lower end connected to the operating levers;
a pair of first shutter handles and a pair of second shutter handles that are rotatably mounted on the cradle and rotate with the movement of the shutter guides;
a first shutter panel and a second shutter panel that are fixed to one end of the first and second shutter handles to open or close a charging part of the circuit breaker and have panel holders on either side; and
a pair of return springs that raises the shutter guides when the main body is pulled out, with the upper end fixed to part of side plates of the cradle and the lower end attached to part of the operating levers,
wherein cam holes are formed on the side plates of the cradle so that the panel holders move along the cam holes when the first shutter panel and the second shutter panel are opened or closed,
wherein the safety shutter further comprises plate-like cam brackets that are attached to the side plates, the cam brackets including bracket cam holes having the same shape as the cam holes.

2. The safety shutter of claim 1, wherein the cam brackets are detachably attached to the side plates.

3. The safety shutter of claim 2, wherein fastening holes are formed in the side plates, and the cam brackets are attached to the fastening holes.

4. The safety shutter of claim 1, wherein rollers are attached to the shafts of the panel holders to cause the panel holders to roll along the cam holes when the first and second shutter panels are opened or closed.

5. The safety shutter of claim 1, wherein the radius of rotation, rotation speed, and rotation angle of the first and second shutter panels are adjusted by varying the shape of the cam holes.

6. The safety shutter of claim 1, wherein the first and second shutter panels, the first and second shutter handles, and the cam brackets are symmetrically arranged at upper and lower portions of the cradle so that, when the main body is retracted, the first shutter panel in the upper portion moves upward and the second shutter panel in the lower portion moves downward.

\* \* \* \* \*